(12) United States Patent
Salice

(10) Patent No.: US 6,553,617 B1
(45) Date of Patent: Apr. 29, 2003

(54) BRAKING RETARDATION APPARATUS FOR DOORS, WINDOWS OR THE LIKE

(75) Inventor: Luciano Salice, Carimate (IT)

(73) Assignee: Arturo Salice S.p.A., Novedrate Como (IT)

( * ) Notice: Subject to any disclaimer, the term of this patent is extended or adjusted under 35 U.S.C. 154(b) by 0 days.

(21) Appl. No.: 09/634,223

(22) Filed: Aug. 9, 2000

(30) Foreign Application Priority Data

Aug. 9, 1999 (DE) ..................... 299 13 854 U

(51) Int. Cl.⁷ .................................... E05F 5/06
(52) U.S. Cl. .............................. 16/85; 16/82
(58) Field of Search .................. 16/85, 86 R, 86 A, 16/82, 51, 62, 64, 69, 281, 374, 375; 49/386; 292/DIG. 15, DIG. 19; 188/882.8, 289, 316, 318, 322.15, 322.19, 322.5

(56) References Cited

U.S. PATENT DOCUMENTS

| | | | | |
|---|---|---|---|---|
| 1,576,286 A | * | 3/1926 | Lang ............................ | 16/51 |
| 1,816,024 A | * | 7/1931 | Petersen ....................... | 16/82 |
| 4,166,522 A | * | 9/1979 | Boucier de Carbon ..... | 188/287 |
| 4,452,437 A | * | 6/1984 | Lochner ....................... | 188/289 |
| 4,601,502 A | * | 7/1986 | Van Dyke ................... | 292/252 |
| 4,817,898 A | * | 4/1989 | Locher ........................ | 188/300 |
| 4,946,008 A | * | 8/1990 | Bauer et al. ................. | 188/129 |
| 4,948,103 A | * | 8/1990 | Bowden et al. ............. | 16/84 |
| 5,632,066 A | * | 5/1997 | Huong ......................... | 16/338 |
| 5,774,939 A | * | 7/1998 | Lu ............................... | 16/342 |

FOREIGN PATENT DOCUMENTS

| | | | | |
|---|---|---|---|---|
| DE | 41733 | | 12/1886 | |
| DE | 196492 | | 5/1907 | |
| DE | 2103374 | | 8/1972 | |
| DE | G8807802.7 | | 8/1988 | |
| DE | 3922932 A1 | * | 1/1991 | ................. 16/82 |
| DE | 4134509 | | 4/1993 | |
| EP | 0111034 A1 | * | 6/1984 | ................. 16/82 |
| FR | 548323 | * | 10/1922 | ................. 16/82 |
| FR | 2586266 | | 2/1987 | |
| GB | 21972 | * | 3/1902 | ................. 16/82 |
| GB | 597024 | * | 1/1948 | ................. 16/82 |
| JP | 279886 | * | 11/1990 | ................. 16/82 |

\* cited by examiner

*Primary Examiner*—Chuck Y. Mah
(74) *Attorney, Agent, or Firm*—Dilworth & Barrese LLP

(57) ABSTRACT

A braking retardation apparatus for doors, windows or the like has a piston pressable into a cylinder against the force of an expelling spring, with the element to be braked acting on the piston rod of said piston. To provide such a braking retardation apparatus with a reduced effort, a grease with high viscosity is applied to the wall of the cylinder.

18 Claims, 2 Drawing Sheets

BRAKING RETARDATION APPARATUS FOR DOORS, WINDOWS OR THE LIKE

BACKGROUND OF THE INVENTION

The invention relates to a braking retardation apparatus for doors, windows or the like comprising a piston pressable into a cylinder against the force of an expelling spring, with the element to be braked acting on the piston rod of said piston.

Braking retardation apparatuses or damping apparatuses of this kind are used, for example, to brake doors and in particular doors of pieces of furniture just before their closing position in order to moderate the impact effect and to ensure the gentlest possible closing. Braking retardation apparatuses are used in particular when the doors and doors of pieces of furniture are provided with closing apparatuses which press said doors into their closing position and hold them in it. Braking retardation apparatuses of the kind first given can, however, also be used for other parts, in particular parts of pieces of furniture, for example for drawers or flaps to prevent these from reaching or hitting their end positions with force and irritating noise. From DE 197 17 937 A, a braking and damping element for moving parts of pieces of furniture of the kind first given is known which comprises a piston movable and spreadable in a radial direction in a cylinder, which piston is designed in such a way that compression of the air performed by the pushing in of the piston effects a radial extension or spreading of the piston, by means of which, in addition to the damping effect due to the compressed air, a braking effect is also caused by friction of the piston on the inside wall of the cylinder.

From DE 37 29 597 A1, a door-closing damper of the kind first given is known which comprises a brake cylinder fixed in the doorframe and a piston having an integrally formed ram which first compresses the air in front of the piston when the door is closed, the air being decompressed after a partial distance by means of a journal sliding through the piston and having a different diameter.

The known braking retardation apparatuses do not only have a complex design, they also require the manufacture of their individual parts with high dimensional accuracy in order to ensure their function. The manufacture of the known braking retardation apparatuses is therefore comparatively expensive.

SUMMARY OF THE INVENTION

It is therefore the object of the invention to provide a braking retardation apparatus of the kind first given which can be manufactured at a favourable price with reduced effort.

This object is solved in accordance with the invention by a grease having a high viscosity being applied to the wall of the cylinder.

The grease of high viscosity generating the braking or damping effect and applied to the wall of the cylinder belongs to the so-called damping greases. It is applied to the inside wall of the cylinder so that it effects the damping or retarding in the interior space between the wall and the piston. The grease of high viscosity used in accordance with the invention can comprise a base oil of high viscosity, an adhesive polymer and synthetic hydrocarbons with high viscosity so that it generates the desired frictional force between the piston and the cylinder when movement occurs.

As the grease of high viscosity used in accordance with the invention also contains an adhesive polymer as a component, it adheres well to the wall of the cylinder without being displaced in a manner such that it could no longer generate its braking effect. In addition, there is so much play between the wall of the cylinder and the piston that the grease develops the effect of a sliding guide without being displaced to any real extent.

The grease of high viscosity used in accordance with the invention provides not only dust protection, but also an effective seal so that the use of additional sealing agents or sealing equipment can be dispensed with.

Appropriately, the wall of the cylinder is provided with annular or spiral channels or grooves which prevent any unwanted transposition of the grease. The wall of the cylinder can also consist of an uneven surface which has, for example, recesses in a given pattern and which also prevents any unwanted transposition of the grease.

Instead of the wall of the cylinder or in addition to the wall of the cylinder, the circumferential surface of the piston can also be provided with annular or spiral channels or grooves or have irregularities.

The cylinder can be closed by a cover, e.g. by a screw plug. This screw plug forms the bottom of the cylinder, between which and the piston the expelling spring is clamped. The expelling spring formed by a compression spring can be designed to be very weak and the force of this spring is overcome in the closed state, for example of a door, by its closing mechanism. In accordance with the only weak design of the expelling spring, the expelling movement of the piston takes place accordingly slowly.

The cover closing the cylinder can be provided with a venting borehole which allows a more gentle movement of the piston.

The piston rod appropriately penetrates a borehole of the front wall of the cylinder, with the ring step between the borehole edge and the cylinder wall forming a stop for the piston.

BRIEF DESCRIPTION OF THE DRAWINGS

One embodiment of the invention is described in more detail below by means of the drawing in which.

DESCRIPTION OF THE PREFERRED EMBODIMENTS

Figure 1:
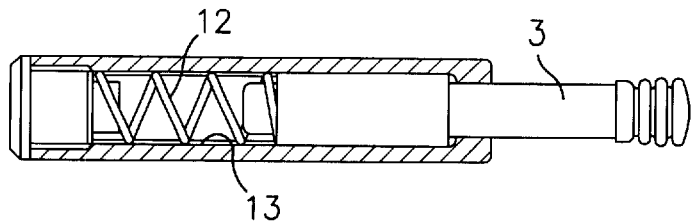
FIG. 1 shows a longitudinal section through the cylinder of the braking retardation apparatus with the piston in the pushed-out state.

The braking retardation apparatus comprises a cylinder 1 in which a piston 2 having an integrally formed piston rod 3 is guided in an axially movable manner. To improve the guiding and friction properties, the piston 2 preferably has an axial length corresponding to roughly half the length of the cylinder 1. An integral manufacture is to be understood as meaning that the piston 2 and the piston rod 3 are made in one process, for example by injection moulding or compression moulding. A journal 4 is formed on the piston 2 and a journal 5 on the piston rod 3. The journal 5 serves the putting on of a head 6 which can consist of an elastomeric material, for example plastic.

The piston rod 3 penetrates a borehole 7 in the front wall of the cylinder 1, with a ring step being formed between the borehole edge and the inside wall 8 of the cylinder which forms a stop for the piston 2.

On the bottom side, the cylinder I is provided with an internal thread 9 in which the screw plug 10 provided with an external thread can be screwed. The screw plug 10 has a journal 11 on its inside, with the journals 4, 11 serving to hold a compression spring 12 which is clamped between the screw plug 10 and the piston 2.

Figure 2:
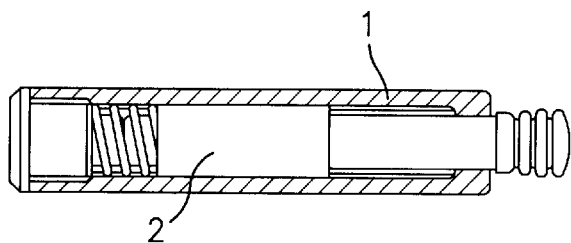
FIG. 2 shows a representation corresponding to FIG. 1 in which the piston is fully pressed into the cylinder.
Figure 3:
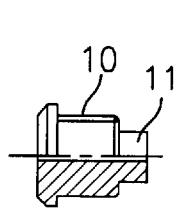
FIG. 3 shows a side view of the plug closing the cylinder at the bottom.
Figure 4:
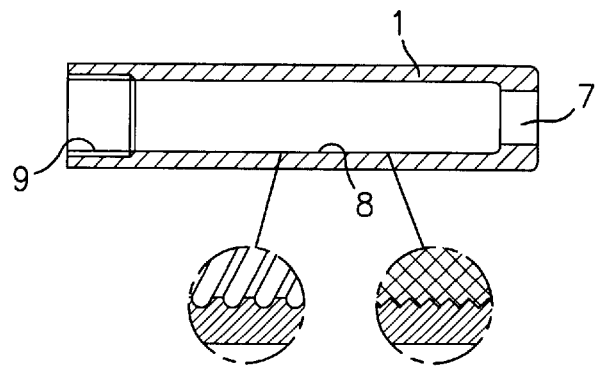
FIG. 4 shows a longitudinal section through the cylinder.
Figure 5:
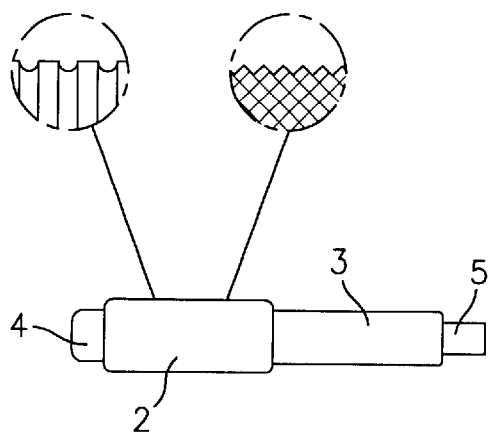
FIG. 5 shows a side view of the piston with the piston rod.
Figure 6:
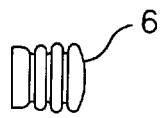
FIG. 6 shows a side view of the head fixed on to the piston rod.

The inside wall 8 of the cylinder 1 and/or the circumferential surface of the piston 2 are provided in a manner not shown with annular or spiral channels or grooves or with recesses. A grease of high viscosity is applied to the inside wall 8 of the cylinder 1. The grease film is indicated in FIG. 1 by the double line 13. This grease film effects the increase in friction between the piston 2 and the cylinder 1 which increases in proportion to the speed of the movement of the piston 2 in the cylinder 1. If the piston 2 is pushed completely into the cylinder 1 in the manner visible from FIG. 2, the compression spring 12 is able to push it out again at a relatively slow speed when the piston is released.

The fluting of the inside wall of the cylinder and the piston and any irregularities serve to prevent any transposition of the grease.

Figure 7:
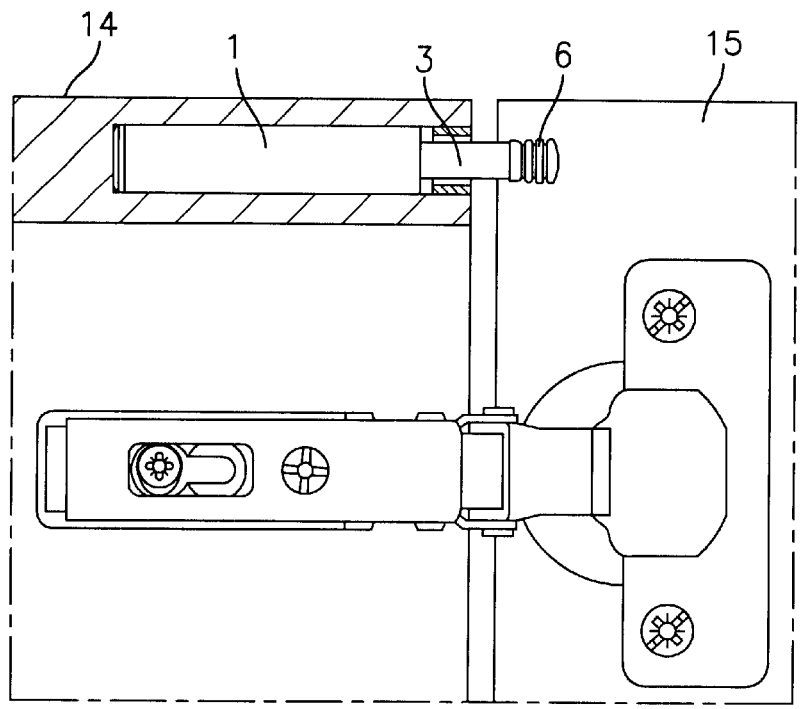
FIG. 7 shows a section through the top corner section of a cupboard with a braking retardation apparatus inserted in a borehole of the top panel with an open door.

FIG. 7 shows an embodiment in which the cylinder 1 of the damping apparatus is inserted into a front borehole in the cover panel 14 of a cupboard. When the door 15 is closed, it impacts the head 6 of the damping apparatus in its closing region so that the piston 2 is pressed into the cylinder 1 while developing its damping effect and an unwanted banging of the door 15 is prevented. If the hinge joint bearing the door 15 is provided with a closing apparatus, this is able to overcome the force of the expelling spring 12.

Figure 8:
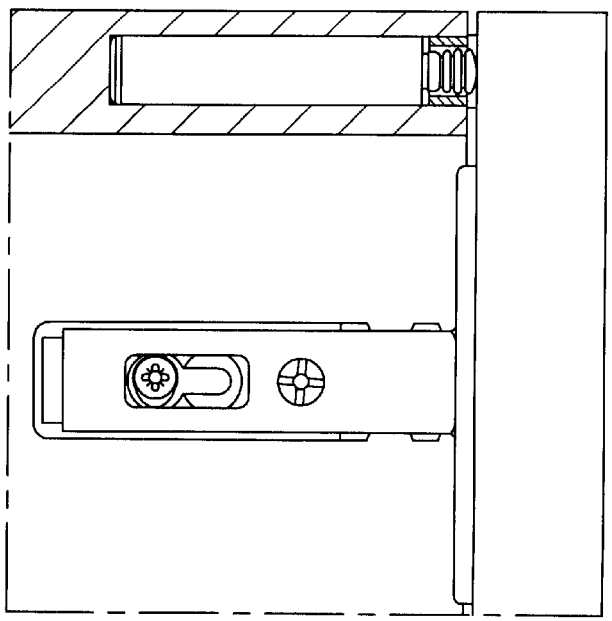
FIG. 8 shows a representation corresponding to FIG. 7 with the door in the closed state.

In FIG. 8, the closing apparatus with the piston pressed in can be seen in the closed state of the door.

What is claimed is:

1. A braking retardation apparatus for doors (15) or windows, comprising
   a piston (2) pressable into a cylinder (1) against force of an expelling spring (12),
   with an element to be braked acting upon a piston rod (3) of said piston (2),
   wherein grease (13) of high viscosity is applied to a wall (8) of the cylinder (1), and
   said wall (8) of said cylinder (1) is provided with annular or spiral channels or grooves.

2. A braking retardation apparatus for doors (15) or windows, comprising
   a piston (2) pressable into a cylinder (1) against force of an expelling spring (12),
   with an element to be braked acting upon a piston rod (3) of said piston (2),
   wherein grease (13) of high viscosity is applied to a wall (8) of the cylinder (1), and
   said wall (8) of said cylinder (1) has an irregular surface.

3. A braking retardation apparatus in accordance with claim 2, wherein an outer circumferential surface of said piston (2) is provided with annular or spiral channels or grooves.

4. A braking retardation apparatus in accordance with claim 2, wherein an outer circumferential surface of said piston (2) is provided with irregularities.

5. A braking apparatus for doors (15) or windows, comprising
   a piston (2) pressable into a cylinder (1) against force of an expelling spring (12),
   with an element to be braked acting upon a piston rod (3) of said piston (2),
   wherein grease (13) of high viscosity is applied to a wall (8) of the cylinder (1), and
   an outer circumferential surface of said piston (2) is provided with annular or spiral channels or grooves.

6. A braking retardation apparatus for doors (15) or windows, comprising
   a piston (2) pressable into a cylinder (1) against force of an expelling spring (12),
   with an element to be braked acting upon a piston rod (3) of said piston (2),
   wherein grease (13) of high viscosity is applied to a wall (8) of the cylinder (1), and
   an outer circumferential surface of said piston (2) is provided with irregularities.

7. A braking retardation apparatus in accordance with claim 6, wherein said wall (8) of said cylinder (1) is provided with annular or spiral channels or grooves.

8. A braking retardation apparatus for doors (15) or windows, comprising
   a piston (2) pressable into a cylinder (1) against force of an expelling spring (12),
   with an element to be braked acting upon a piston rod (3) of said piston (2),
   wherein grease (13) of high viscosity is applied to a wall (8) of the cylinder (1), and,
   said grease (13) of high viscosity comprises at least one of a base oil of high viscosity, an adhesive polymer and synthetic hydrocarbons with high viscosity, such that said grease adheres well to the wall (8) of said cylinder (1) without being displaced, there being play between the wall (8) of the cylinder (1) and said piston (2) such that said grease (13) develops the effect of a sliding guide without being displaced to any real extent.

9. A braking retardation apparatus in accordance with claim 8, wherein said cylinder (1) is closed at one axial end thereof by a cover (10).

10. A braking retardation apparatus in accordance with claim 9, wherein said cover (10) is a screw plug.

11. A braking retardation apparatus in accordance with claimed 8, wherein an axial front wall of said cylinder (1) is provided with a borehole (7) therethrough and arranged such that said piston rod (3) penetrates said borehole (7).

12. A braking retardation apparatus in accordance with claim 11, wherein a ring step between an edge of said borehole (7) in said front axial end wall of said cylinder (1) and the cylinder wall (8) forms a stop for said piston (2).

13. A braking retardation apparatus in accordance with claim 8, wherein said spring (12) is a compression spring (12) clamped between an axial bottom of said cylinder (1) and said piston (2).

14. A braking retardation apparatus in accordance with claim 8, wherein said wall (8) is an inner cylindrical wall of said cylinder (1).

15. A braking apparatus in accordance with claim 8, wherein said piston (2) has an axial length corresponding to roughly one half axial length of said cylinder (1).

16. A braking retardation apparatus in accordance with claim 8, wherein said grease forms a film (11) along the wall (8) of said cylinder (1) to effect increase in friction between said piston (2) and cylinder (1) which increases in proportion of speed of movement of said piston (2) in said cylinder (1), such that when said piston (2) is retracted completely into said cylinder (1), said spring (1 2) is able to push out said piston (2) at relatively slow speed when said piston (2) is released.

17. A braking retardation apparatus for doors (15) or windows, comprising
 a piston (2) pressable into a cylinder (1) against force of an expelling spring (12),
 with an element to be braked acting upon a piston rod (3) of said piston (2),
 wherein grease (13) of high viscosity is applied to a wall (8) of the cylinder (1),
 said cylinder (1) is closed at one axial end thereof by a cover (10), and
 said cover (10) is provided with a venting borehole.

18. A braking retardation apparatus for doors (15) or windows, comprising
 a piston (2) pressable into a cylinder (1) against force of an expelling spring (12),
 with an element to be braked acting upon a piston rod (3) of said piston (2),
 wherein grease (13) of high viscosity is applied to a wall (8) of the cylinder (1),
 an axial front wall of said cylinder (1) is provided with a borehole (7) therethrough and arranged such that said piston rod (3) penetrates said borehole (7), and
 additionally comprising
  a journal (4) positioned on an axial end of said piston (2),
  a journal (5) position ed on an opposite axial end of said piston rod (3),
  an axial rear end of said cylinder (10) being closed by a cover (10) in turn provided with a journal (11), such that said journals (4, 11) of said piston (2) and cover (11) are structured and arranged to retain said spring (12) which is a compression spring being clamped between said cover (10) and piston (2), and
  a head (6) positioned upon said journal (5) on said axial end of said piston rod (3) and arranged to extend beyond said bore- hole (7) in said front wall of said cylinder (1) and outside of an interior of said cylinder (1).

* * * * *